United States Patent
Yamada

(10) Patent No.: US 9,813,620 B2
(45) Date of Patent: Nov. 7, 2017

(54) IMAGE PROCESSING APPARATUS, IMAGE PROCESSING METHOD, PROGRAM, AND CAMERA

(71) Applicant: JVC KENWOOD Corporation, Yokohama-shi, Kanagawa (JP)

(72) Inventor: Kunio Yamada, Yokohama (JP)

(73) Assignee: JVC KENWOOD CORPORATION, Yokohama-Shi, Kanagawa (JP)

(*) Notice: Subject to any disclaimer, the term of this patent is extended or adjusted under 35 U.S.C. 154(b) by 203 days.

(21) Appl. No.: 14/667,561

(22) Filed: Mar. 24, 2015

(65) Prior Publication Data
US 2015/0281575 A1 Oct. 1, 2015

(30) Foreign Application Priority Data

Mar. 31, 2014 (JP) ................ 2014-071740
Mar. 31, 2014 (JP) ................ 2014-071741
Jun. 5, 2014 (JP) ................ 2014-116765

(51) Int. Cl.
*H04N 7/00* (2011.01)
*H04N 5/89* (2006.01)
(Continued)

(52) U.S. Cl.
CPC ....... *H04N 5/23238* (2013.01); *G06T 3/4038* (2013.01); *G06T 11/60* (2013.01); *H04N 5/265* (2013.01)

(58) Field of Classification Search
CPC H04N 7/00; H04N 5/89; H04N 13/00; H04N 15/00
(Continued)

(56) References Cited

U.S. PATENT DOCUMENTS

2001/0013952 A1* 8/2001 Boon ............... H04N 19/507
375/240.08
2007/0223909 A1 9/2007 Tanaka
(Continued)

FOREIGN PATENT DOCUMENTS

| JP | 200446573 A | 2/2004 |
|---|---|---|
| JP | 2007-266667 A | 10/2007 |
| JP | 2013228896 A | 11/2013 |

OTHER PUBLICATIONS

U.S. Appl. No. 14/663,961, filed Mar. 20, 2015 (not yet published); related application.
(Continued)

*Primary Examiner* — Daquan Zhao
(74) *Attorney, Agent, or Firm* — Procopio, Cory, Hargreaves & Savitch LLP

(57) ABSTRACT

Provided are an image processing apparatus, an image processing method, a program, and a camera which are cable of generating a joined image in which distortions and seams are less likely to occur. An image processing apparatus according to an exemplary embodiment generates a joined image by joining a plurality of textures based on a plurality of images, and includes a second derivation unit that derives a motion between images of the plurality of images, and a texture writing unit that writes, into a frame memory, the plurality of textures that form the joined image, based on the motion between the images. The plurality of textures include a texture having such a shape that at least a part of an outline thereof is curved.

8 Claims, 18 Drawing Sheets

(51) Int. Cl.
    *H04N 15/00*   (2006.01)
    *H04N 5/232*   (2006.01)
    *H04N 5/265*   (2006.01)
    *G06T 11/60*   (2006.01)
    *G06T 3/40*    (2006.01)
    *H04N 13/00*   (2006.01)

(58) Field of Classification Search
    USPC .......................................... 348/36, 37, 38, 39
    See application file for complete search history.

(56) References Cited

U.S. PATENT DOCUMENTS

2013/0038680 A1* 2/2013 Mashiah ............ H04N 5/23238
                                                      348/36
2013/0287304 A1  10/2013 Kimura
2014/0294088 A1* 10/2014 Sung .................... H04N 19/597
                                                      375/240.16

OTHER PUBLICATIONS

U.S. Appl. No. 14/667,584, filed Mar. 24, 2015 (not yet published); related application.
Tokuhara, Dai, "New Sense Camera of Pure Domestic Production!—It approaches the Charm of RICOH THETA That Can Shoot 360°" 4 pages. Oct. 9, 2013 mynavinews newstop > Technology > Embedded / loT [Oct. 9, 2013], Japan, mynavi news, Oct. 9, 2013, Downloaded from http://news.mynavi.jp/articles/2013/10/09/ricoh_theta/.

* cited by examiner

IMAGE PROCESSING APPARATUS, IMAGE PROCESSING METHOD, PROGRAM, AND CAMERA

INCORPORATION BY REFERENCE

This application is based upon and claims the benefit of priority from Japanese patent application No. 2014-071740, filed on Mar. 31, 2014, Japanese patent application No. 2014-071741, filed on Mar. 31, 2014 and Japanese patent application No. 2014-116765, filed on Jun. 5, 2014, the disclosure of which is incorporated herein in its entirety by reference.

BACKGROUND OF THE INVENTION

1. Field of the Invention

The present invention relates to an image processing apparatus, an image processing method, a program, and a camera.

2. Description of Related Art

In recent years, a technique for creating a still image panorama by photographing a moving image while manually moving a camera so as to cover a large subject has been put into practical use. In this technique, a panoramic image is generated by joining the frame images constituting the moving image. A technique for creating a panoramic still image is generalized in the form of, for example, an additional function of a digital camera. This technique is based on a method in which a motion vector is derived during shooting with a panning technique and an area for a seam between frame images to be stitched together is controlled based on the motion vector.

There is also a technique for forming a large image by connecting a plurality of still images or moving image sequences (Japanese Unexamined Patent Application Publication No. 2007-266667). This technique is generally and widely known as panorama, photomosaicing, and the like. Especially since the time that use of digital cameras became widespread, the use of software for automatically or semi-automatically performing such processing has become widespread. A panoramic still image is basically created based on a linear camera trajectory. However, in principle, it is possible to join moving images captured along a free two-dimensional camera trajectory.

SUMMARY OF THE INVENTION

A first exemplary aspect of the present invention is an image processing apparatus that generates a joined image by joining a plurality of textures based on a plurality of images, the image processing apparatus including: a derivation unit that derives a motion between images of the plurality of images; and a texture writing unit that writes, into a frame memory, the plurality of textures that form the joined image, based on the motion between the images. The plurality of textures include a texture having such a shape that at least a part of an outline thereof is curved.

A second exemplary aspect of the present invention is an image processing method that generates a joined image by joining a plurality of textures based on a plurality of images, the image processing method including: a derivation step of deriving a motion between images of the plurality of images; and a texture writing step of writing, into a frame memory, the plurality of textures that form the joined image, based on the motion between the images. The plurality of textures include a texture having such a shape that at least a part of an outline thereof is curved.

A third exemplary aspect of the present invention is a non-transitory computer readable medium storing a program for causing a computer to execute image processing that generates a joined image by joining a plurality of textures based on a plurality of images, the image processing including: a derivation step of deriving a motion between images of the plurality of images; and a texture writing step of writing, into a frame memory, the plurality of textures that form the joined image, based on the motion between the images. The plurality of textures include a texture having such a shape that at least a part of an outline thereof is curved.

A fourth exemplary aspect of the present invention is an image processing apparatus that generates a joined image by joining a plurality of textures based on a plurality of images, the image processing apparatus including: a frame memory into which the plurality of textures that form the joined image are written; a first derivation unit that derives a first motion vector based on a first texture representing a partial area or an entire area of an image captured by an image pickup unit that captures the plurality of images; a second derivation unit that derives a second motion vector based on a second texture by using a derivation result of the first derivation unit, the second texture having a pixel size smaller than that of the first texture; and a texture writing unit that writes, into the frame memory, the second texture at a position corresponding to the second motion vector.

A fifth exemplary aspect of the present invention is an image processing method that generates a joined image by joining a plurality of textures based on a plurality of images, the image processing method including: deriving a first motion vector based on a first texture, the first texture being a partial area or an entire area of an image captured by an image pickup unit that captures the plurality of images; deriving a second motion vector based on a second texture by using a derivation result of the first motion vector, the second texture having a pixel size smaller than that of the first texture; and writing, as the plurality of textures that form the joined image, the second texture into a frame memory at a position corresponding to the second motion vector.

A sixth exemplary aspect of the present invention is a non-transitory computer readable medium storing a program for causing a computer to execute image processing that generates a joined image by joining a plurality of textures based on a plurality of images, the image processing including: deriving a first motion vector based on a first texture, the first texture being a partial area or an entire area of an image captured by an image pickup unit that captures the plurality of images; deriving a second motion vector based on a second texture by using a derivation result of the first motion vector, the second texture having a pixel size smaller than that of the first texture; and writing, as the plurality of textures that form the joined image, the second texture into a frame memory at a position corresponding to the second motion vector.

DESCRIPTION OF THE EXEMPLARY EMBODIMENTS

In the process of joining moving images captured along a free two-dimensional camera trajectory, a global motion vector between the latest frame and the previous frame is generally estimated, and the latest frame is sequentially overwritten according to the motion vector. In other words, the frame memory is overwritten with frame images as textures. The position where the textures are to be overwritten in the frame memory is determined according to the motion vector.

In this case, when the frame memory is overwritten with rectangular textures, the textures which are distanced by a certain length of time or more are adjacent to each other depending on the camera trajectory. In such a case, distortions and seams formed due to differences in brightness or color become noticeable. This will be described with reference to FIGS. 16 to 18.

Figure 16:
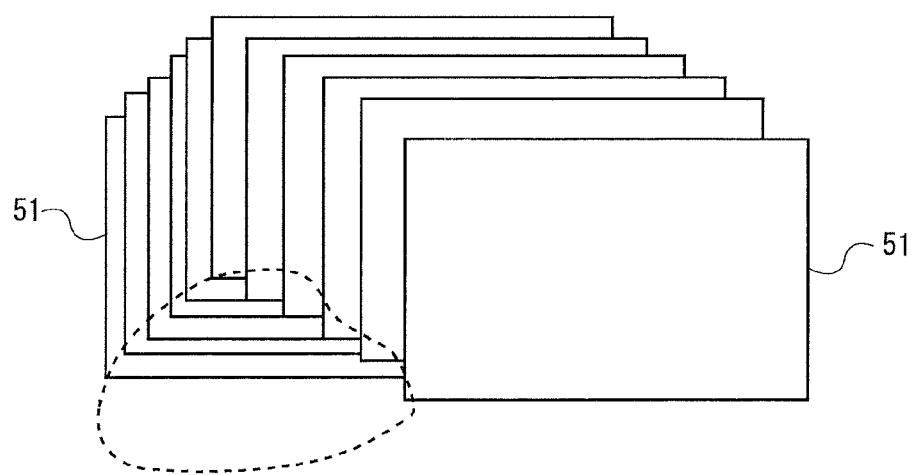
FIG. 16 is a diagram showing a trajectory formed by rectangular textures when the angle of view is two-dimensionally moved.

FIG. 16 shows a state in which moving image frames captured along a free trajectory are overwritten with rectangular textures according to the motion. Specifically, FIG. 16 shows rectangular textures 51 which are obtained by two-dimensionally changing the angle of view. Referring to FIG. 16, the previous frame is hidden behind the rectangular textures 51 to be overwritten. The textures are overwritten from left to right in chronological order as shown in FIG. 16.

In this case, in an area surrounded by the dotted line in FIG. 16, an initially-overwritten portion is adjacent to a portion that has been overwritten relatively recently, so that distortions, seams formed due to differences in brightness or color, and the like occur.

Figure 17:
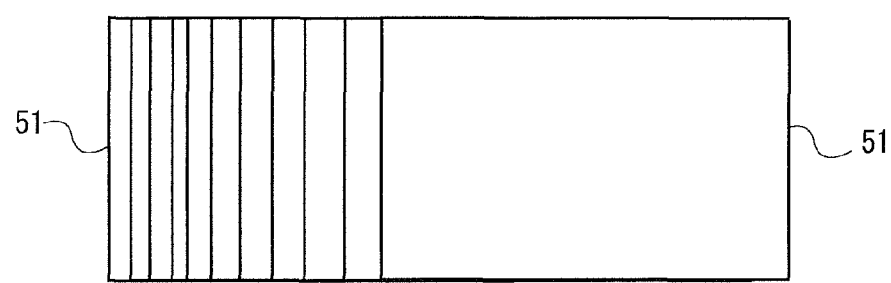
FIG. 17 is a diagram showing a trajectory formed by rectangular textures when the angle of view is moved only in the horizontal direction.
Figure 18:
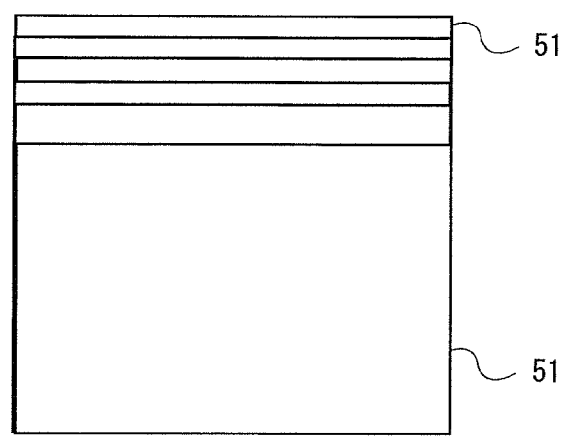
FIG. 18 is a diagram showing a trajectory formed by rectangular textures when the angle of view is moved only in the vertical direction.

FIG. 17 shows an example in which the camera trajectory is limited only in the horizontal direction, and FIG. 18 shows an example in which the camera trajectory is limited only in the vertical direction. When the direction of movement of the angle of view is limited only to the horizontal direction or the vertical direction, the problem with the area surrounded by the dotted line in FIG. 16 does not occur. As shown in FIG. 16, when the image pickup direction is changed two-dimensionally, distortions and seams occur, which makes it difficult to appropriately generate a joined image The present invention has been made in view of the above-mentioned circumstances, and an object of the present invention is to provide an image processing apparatus, an image processing method, a program, and a camera which are capable of generating a joined image in which distortions and seams are less likely to occur.

An image processing apparatus according to an exemplary embodiment of the present invention is incorporated in, for example, a camera for taking moving images. When a user who uses the camera selects a panoramic still image mode, a panoramic still image is generated based on moving images.

The image processing apparatus generates a joined image by joining a plurality of images captured by changing an image pickup direction. For example, the user performs a pan operation to change the image pickup direction of the camera to the horizontal direction (right-left direction). Specifically, the angle of view of the camera is changed when the camera is moved during the obtainment of the moving images which are a set of still images captured continuously in terms of time. Textures obtained from each frame (still image) of the moving images thus obtained are joined together to thereby generate a joined image. For example, one joined image can be generated by overwriting a frame memory with the textures. Each texture may be a frame itself, or a partial area of the frame. The angle of view of the camera indicates a range in which images can be captured by the camera (image pickup unit), and the angle of view of the camera corresponds to the field of view of the camera. Thus, the user performs the pan operation to change the direction of the camera, thereby changing the angle of view (field of view).

The image pickup direction may be changed not only to the horizontal direction but also to the vertical direction (up-down direction). In this manner, the image processing apparatus generates a joined image by using the moving images that are captured by the user while manually moving the camera freely in a two-dimensional manner. The joined image has a pixel size larger than the image size of the images captured by the image pickup device.

Figure 1:
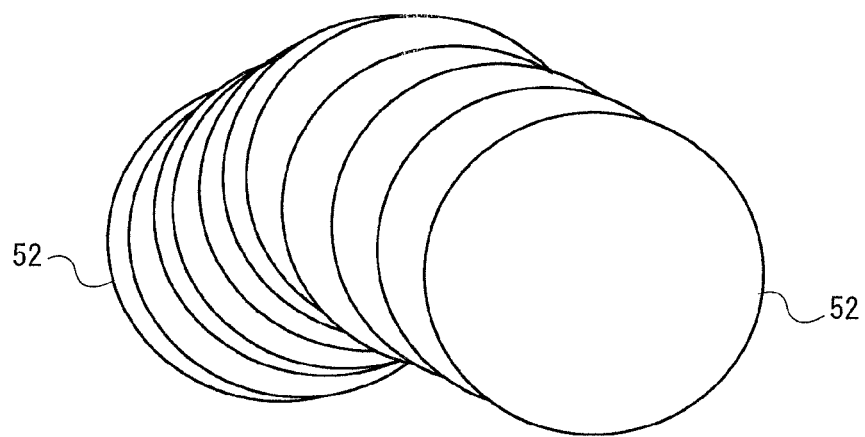
FIG. 1 is a diagram showing a trajectory formed by circular textures.

A feature of the image processing apparatus according to an exemplary embodiment of the present invention is to use a first texture and a second texture having a pixel size smaller than that of the first texture. For example, when a circular texture is used as the second texture, the texture has no direction. Accordingly, it is possible to provide a technique for joining images in such a way as to make the distortions and differences in brightness or color unnoticeable, regardless of how the image pickup direction is changed. FIG. 1 shows a trajectory formed by textures each having a circular shape.

FIG. 1 is a diagram showing a trajectory formed by circular textures 52 when the image pickup direction is two-dimensionally moved. Referring to FIG. 1, the trajectory represents a motion similar to that shown in FIG. 16. The circular textures 52 are overwritten from left to right in chronological order as shown in FIG. 1.

Referring to FIG. 1, an initially-overwritten portion is not adjacent to a portion that has been overwritten relatively recently. That is, the textures which are greatly spaced apart in terms of time are less likely to be adjacent to each other. In other words, the textures of each frame image which are separated by a long length of time are spatially spaced apart from each other and are more easily arranged, so that seams between the textures of each frame image which are separated by a long length of time can be reduced. Consequently, the problem of occurrence of distortions and seams formed due to differences in brightness or color can be avoided.

When the trajectory of the camera is limited to the horizontal direction or the vertical direction, the above-mentioned problem of occurrence of distortions and seams is less likely to occur. In this case, the size of the absolute area of each texture can be utilized by overwriting the texture with a rectangular texture. This makes it possible to generate a larger joined image.

Further, the shape of each texture may be changed according to a motion between frame images. For example, the shape of each texture can be changed according to the ratio between motion components in the horizontal direction and motion components in the vertical direction. Specifically, various textures, such as a circular texture, which is a texture having such a shape that at least a part of the outline thereof is curved, an elliptical texture, a texture having no corner, and a rectangular texture, can be properly used according to the motion. The ellipticity of the elliptical texture may also be changed.

Note that any combination of the above-mentioned components and expressions of the present invention as a method, an apparatus, a system, a recording medium, a computer program, and the like are also effective as aspects of the present invention.

First Exemplary Embodiment

Figure 2:
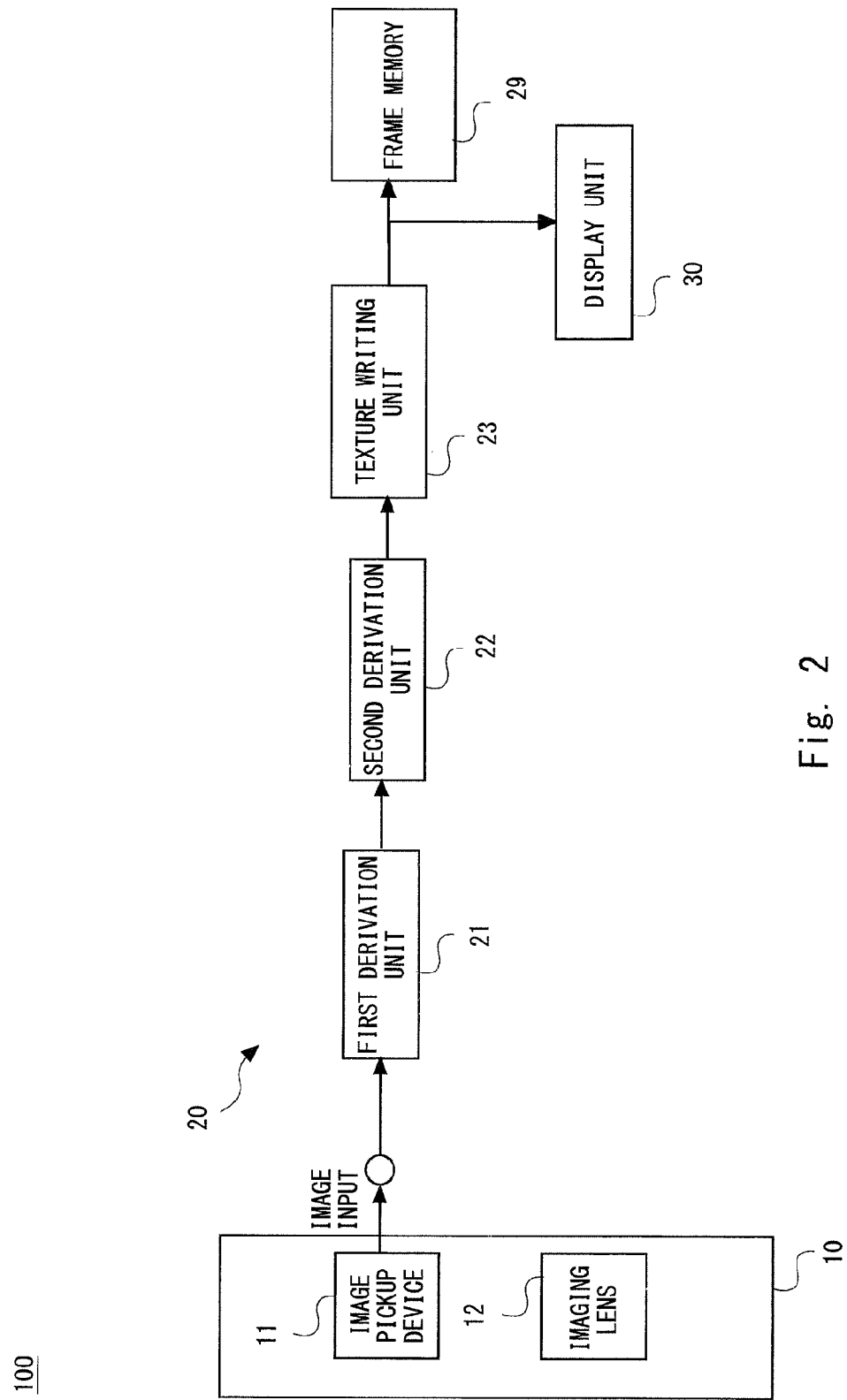
FIG. 2 is a block diagram showing a configuration of a camera according to a first exemplary embodiment.

Next, configurations of an image processing apparatus and a camera according to a first exemplary embodiment will be described with reference to FIG. 2. FIG. 2 is a block diagram showing the configuration of the camera that incorporates the image processing apparatus according to the first exemplary embodiment.

A camera 100 includes an image pickup unit 10, an image processing apparatus 20, and a display unit 30. The image processing apparatus 20 performs image processing for generating a joined image from moving images. The image processing apparatus 20 includes a first derivation unit 21, a second derivation unit 22, a texture writing unit 23, and a frame memory 29.

The frame memory 29 includes a predetermined number of pixels in the vertical direction and the horizontal direction. For example, the frame memory 29 has a rectangular pixel structure. In the frame memory 29, the textures that form the joined image are each written at a pixel position corresponding to a motion vector between pixels. The frame memory 29 serves as a storage unit into which the textures that form the joined image are written.

The image pickup unit 10 photoelectrically converts light from a subject to generate a moving image. The light is input to an image pickup device 11 through an imaging lens 12. The image pickup unit 10 outputs the generated moving image to the image processing apparatus 20. The image pickup device 11 is a CCD (Charge Coupled Device) or a CMOS (Complementary Metal Oxide Sensor) device. The moving image obtained by the image pickup unit 10 is input to the image processing apparatus 20. The display unit 30 includes a display device such as a liquid crystal display or an organic EL (Electroluminescence) display. The display unit 30 displays the moving image obtained by the image pickup unit 10. Specifically, the display unit 30 sequentially displays each frame of the moving image. The camera 100 is provided with an operation unit (not shown) with which the user operates the camera. For example, when a touch panel is used as the display unit 30, the display unit 30 serves as the operation unit. The operation unit may be buttons or the like.

Each block in the image processing apparatus 20 can be implemented in a hardware manner by a CPU (Central Processing Unit), a memory, and other LSI (Large Scale Integration) of any computer, and can be implemented in a software manner by, for example, a program loaded into the memory. FIG. 2 illustrates the functional blocks implemented in a cooperative manner. Accordingly, it can be understood by those skilled in the art that these functional blocks can be implemented in various manners by, for example, using only hardware, using only software, or using a combination thereof.

Figure 3:
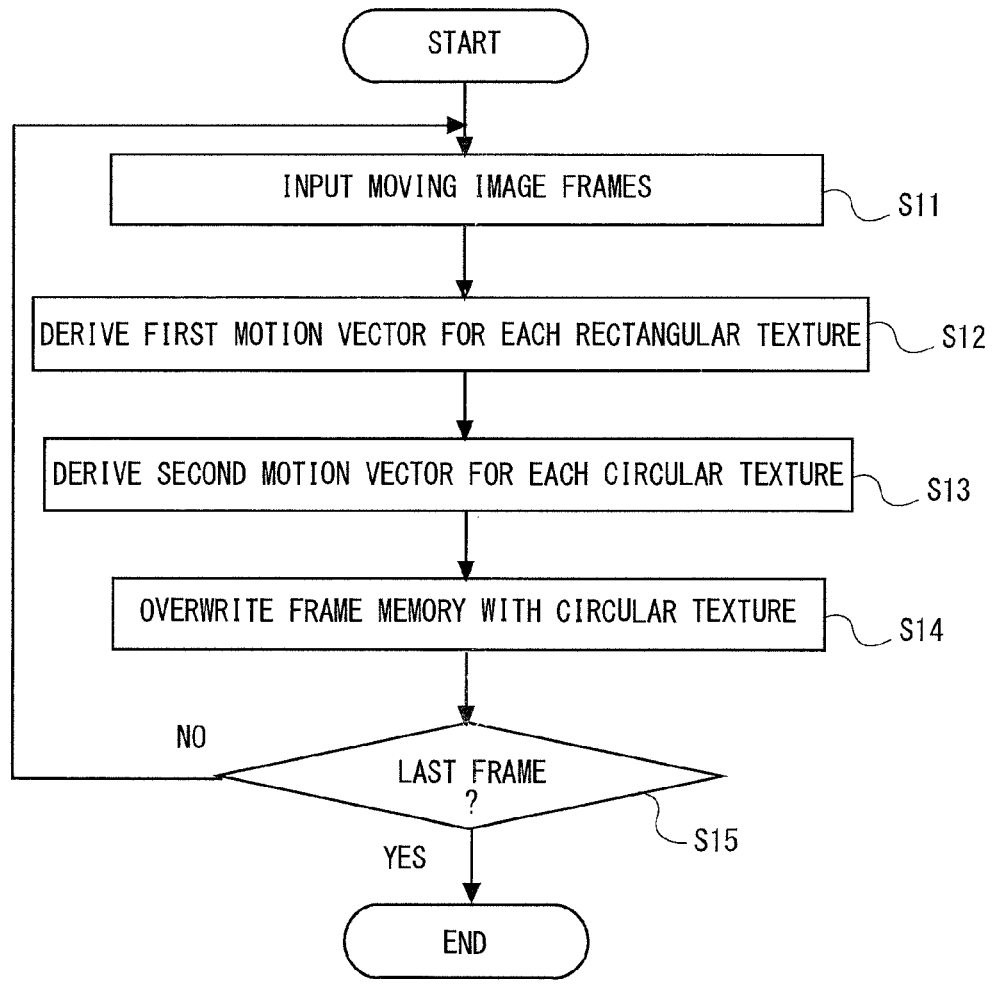
FIG. 3 is a flowchart showing an image processing method according to the first exemplary embodiment.

The processing of each block in the image processing apparatus 20 will be described below with reference to FIG. 3. FIG. 3 is a flowchart showing an image processing method according to the first exemplary embodiment. The processing for generating a joined image will be described below. Since well-known techniques can be used for normal processing in the camera 100, i.e., processing other than the processing for generating a joined image, the description of the normal processing is omitted.

First, the image pickup unit 10 inputs the frame images, which form the moving image, to the image processing apparatus 20 (S11). Then the first derivation unit 21 derives a first motion vector for a rectangular texture that matches the entirety of one frame image (S12). The first derivation unit 21 derives, for example, a global motion vector between two successive frame images as the first motion vector. A well-known matching evaluation method can be used to derive the first motion vector. For example, the first derivation unit 21 performs matching between the two frame images pixel by pixel, and detects, as a motion, the amount of displacement obtained when the error is minimized. Further, the first derivation unit 21 derives the motion between the frame images in the form of a two-dimensional vector.

The first derivation unit 21 uses a rectangular texture having the same pixel size as that of the frame image. The first derivation unit 21 compares the rectangular textures of the two frame images, thereby deriving the first motion vector.

Next, the second derivation unit 22 derives a second motion vector based on the derivation result of the first derivation unit 21 (S13). The second derivation unit 22 derives the second motion vector by using a circular texture which is a part of the frame image and is inscribed concentrically with the frame image. The second derivation unit 22 derives the motion vector for circular textures corresponding to two frame images by a well-known matching evaluation method in the same manner as described above. The second derivation unit 22 derives a global motion vector between the circular textures of two successive frame images as the second motion vector.

Figure 4:
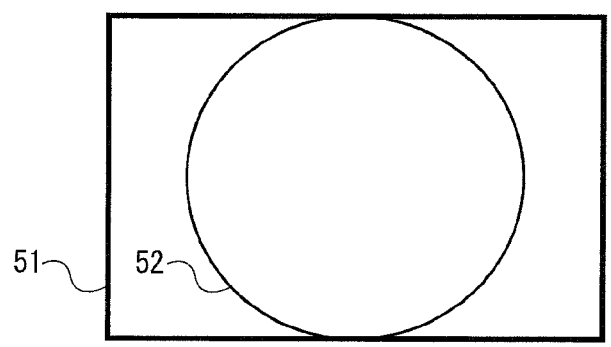
FIG. 4 is a diagram showing textures in a frame image.

FIG. 4 is a diagram showing the rectangular texture 51 and the circular texture 52 in a rectangular frame image 50. The rectangular texture 51 is used to derive the first motion vector. The circular texture 52 is used to derive the second motion vector. The rectangular frame image 50 and the rectangular texture 51 have the same size. The circular texture 52 has a size smaller than that of the rectangular texture 51. In other words, the entire circular texture 52 is included in the rectangular texture 51. The circular texture 52 has a circular shape that is inscribed in the frame image 50 concentrically with the frame image 50.

This configuration enables the calculation of the first and second motion vectors in such a manner that the first motion vector, which is an approximate motion vector, is calculated in advance using a large number of pixels of the rectangular texture 51 and then the second motion vector, which is a more accurate vector, is calculated using the circular texture 52 located at the center of the image where the effect of lens distortion is small.

The second derivation unit 22 derives the second motion vector by using the derivation result of the first derivation unit 21. For example, the second derivation unit 22 determines a motion vector search range in which matching evaluation is performed, based on the first motion vector derived by the first derivation unit 21. The second derivation unit 22 two-dimensionally shifts the circular texture 52 in the motion vector search range whose center matches with a position corresponding to the first motion vector. That is, the motion vector search range in which the circular texture 52 is shifted for matching can be set according to the first motion vector. The motion vector search range used for the second motion vector can be made narrower than the matching range used to derive the first motion vector. This results in a reduction in time for deriving the motion vectors.

Further, the first derivation unit 21 uses the rectangular texture 51 having the same pixel size as that of the entire frame image. In this case, matching is performed on all pixels of the entire frame image. When the entire frame image is used, the number of pixels is large, which may lead to an increase in processing time. To shorten the processing time, a motion vector search can be performed at a pitch of, for example, every other pixel, or every two or more pixels, instead of performing the motion vector search on a per pixel basis. That is, the first derivation unit 21 performs a matching evaluation on the frame image at intervals of a plurality of pixels.

On the other hand, the second derivation unit 22 performs a matching evaluation using all pixels included in the circular texture 52. In this manner, a motion vector can be derived by the second derivation unit 22 which is more accurate than the motion vector previously derived by the first derivation unit 21. Thus, the motion vectors can be accurately calculated in a short time.

As described above, the second derivation unit 22 derives the second motion vector based on the first motion vector. This makes it possible to appropriately derive the motion vector for the circular texture 52.

The texture writing unit 23 overwrites the frame memory 29 with the circular textures 52 based on the second motion vector (S14). In effect, the second motion vector represents the misalignment of the circular textures 52 between the frame images. Accordingly, the circular textures 52 are aligned according to the second motion vector on the frame memory 29. Then the texture writing unit 23 writes each circular texture 52 into the frame memory 29 at a position corresponding to the second motion vector.

Next, it is determined whether the frame is the last frame or not (S15). When it is determined that the frame is not the last frame (NO in S15), the process returns to step S11 to repeat the process of: inputting moving image frames (S11); deriving the first motion vector (S12); deriving the second motion vector (S13); and overwriting the circular textures (S14). On the other hand, when it is determined that the frame is the last frame (YES in S15), the processing ends. Thus, the generation of the joined image is completed.

In this manner, the joined image is generated by repeatedly overwriting the frame memory 29 with the circular texture 52 of the temporally subsequent frame image. In other words, the frame memory 29 stores the joined image formed of a set of the circular textures 52 corresponding to the number of the input frames. When the last frame is input, i.e., when there is no more moving image frames to be input, the image processing apparatus 20 terminates the process. The display unit 30 displays the joined image stored in the frame memory 29.

Figure 5:
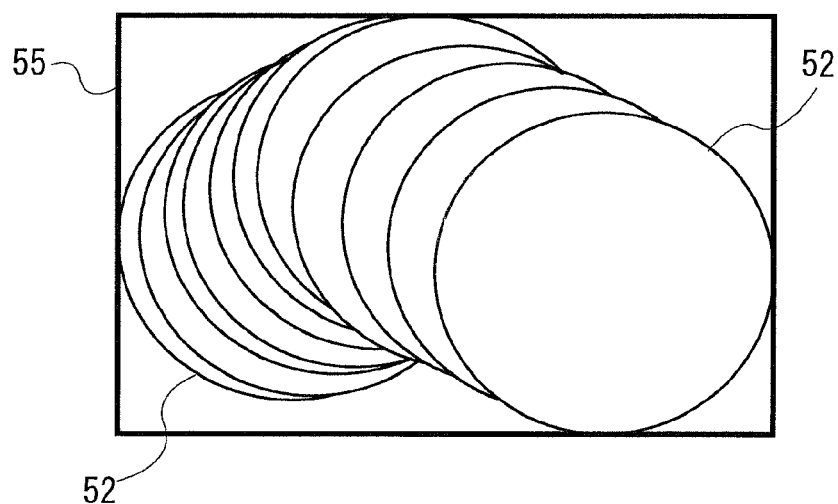
FIG. 5 is a diagram showing a joined image generated using circular textures.

FIG. 5 shows the shape of a joined image 55 which is finally obtained. A rectangular area in which the circular textures 52 are written corresponds to the joined image. In other words, a minimum rectangular area including all pixels in which the textures are written in the frame memory 29 corresponds to the joined image 55. The joined image 55 may have any shape other than a rectangular shape.

As described above, the use of the circular texture 52 prevents the circular textures, which are greatly spaced apart in terms of time, from being adjacent to each other. In other words, the textures of each frame image which are separated by a long length of time are more easily arranged away from each other, so that seams between the textures of each frame image which are separated by a long length of time can be reduced. Consequently, the problem of occurrence of distortions and seams formed due to differences in brightness or color can be avoided. The above-described method can avoid the problem that in the process of creating a still image by joining moving images captured while manually moving the camera along a free two-dimensional trajectory, distortions and seams formed due to differences in brightness or color become noticeable during photographing along a reciprocating camera trajectory.

While the circular texture 52 that is inscribed in the frame image is used in the motion estimation described above, circles or ellipses of various sizes, a quadrangle (so-called rhomboid) with diagonal lines respectively parallel to the horizontal line and the vertical line, other polygons, or free-form figures can be used as the second texture. The second texture preferably has a shape other than a rectangle, and more preferably has a shape closer to a circle.

The use of the circular texture 52 as the second texture can prevent the textures of successive frame images from being adjacent to each other in the joined image, regardless of how the image pickup direction is changed. In other words, the use of the circular texture 52 enables the arrangement of the textures in such a manner that the textures of successive frame images in terms of time are adjacent to each other.

While the above exemplary embodiment has been described assuming that the rectangular texture 51 coincides with the frame image 50, the rectangular texture may be a part of the frame image 50. That is, the first texture used to derive the first motion vector may be a partial area or an entire area of the frame image. The size of the second texture used to derive the second motion vector may be smaller than the size of the first texture.

Second Exemplary Embodiment

A second exemplary embodiment is characterized by including a determination unit that determines which one of the first texture and the second texture is written into the memory, according to a horizontal component and a vertical component of a motion vector.

Figure 6:
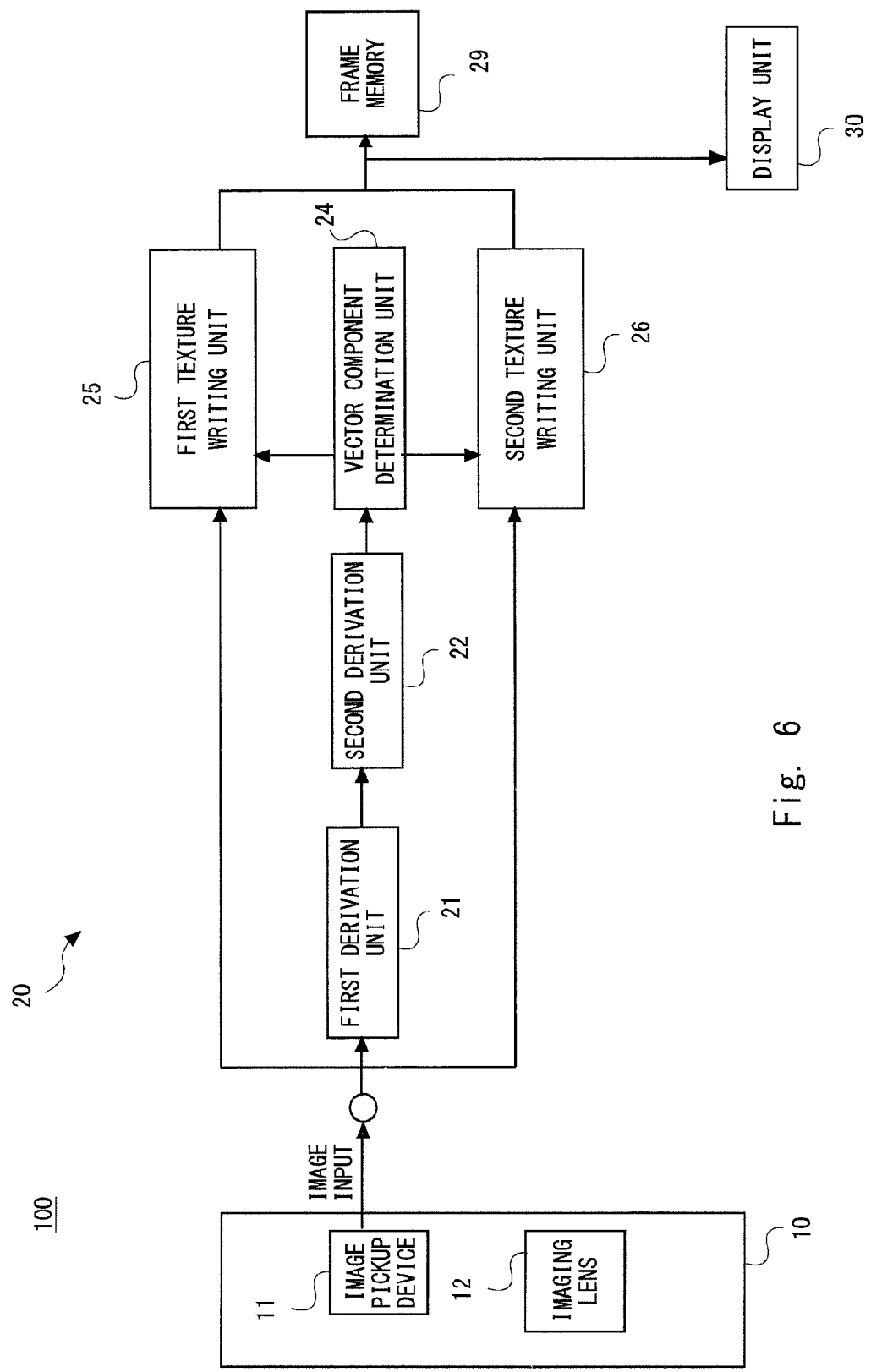
FIG. 6 is a block diagram showing a configuration of a camera according to a second exemplary embodiment.
Figure 7:
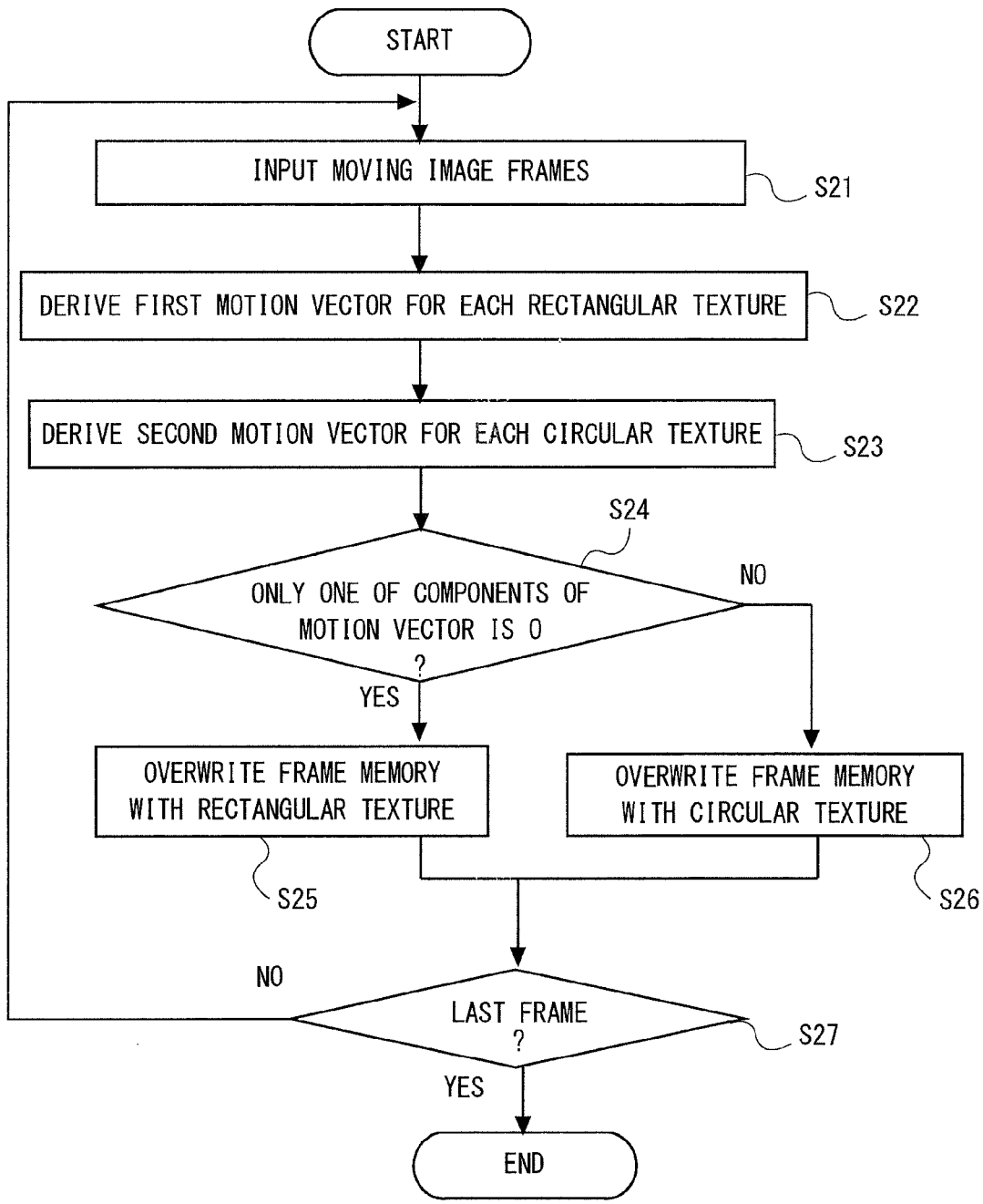
FIG. 7 is a flowchart showing an image processing method according to the second exemplary embodiment.

An image processing apparatus and an image processing method according to the second exemplary embodiment will be described with reference to FIGS. 6 and 7. FIG. 6 is a block diagram showing the configuration of the camera 100 that incorporates the image processing apparatus 20. FIG. 7 is a flowchart showing the processing in the image processing apparatus 20.

In the second exemplary embodiment, a vector component determination unit 24 is added to the configuration of the camera according to the first exemplary embodiment shown in FIG. 2. Further, a first texture writing unit 25 and a second texture writing unit 26 are provided instead of the texture writing unit 23 of the first exemplary embodiment. Since the basic configuration of the image processing apparatus 20 and the processing method thereof are similar to those of the first exemplary embodiment, the description thereof is omitted. For example, the processing for deriving the motion vectors in the first derivation unit 21 and the second derivation unit 22 is similar to that of the first exemplary embodiment, and thus the description thereof is omitted. Further, since steps S21 to S23 and S27 are respectively similar to steps S11 to S13 and S15 of the first exemplary embodiment, the description thereof is omitted.

In step S23, after the derivation of the second motion vector, the vector component determination unit 24 determines whether only one of the components of the second motion vector is 0 (S24). Specifically, the vector component determination unit 24 determines whether the horizontal component or the vertical component of the motion vector is 0. Thus, the vector component determination unit 24 determines whether the motion vector represents a motion only in the vertical direction or the horizontal direction. The horizontal direction and the vertical direction are directions respectively parallel to the end sides of the frame image.

The vector component determination unit 24 determines whether the motion of the circular texture 52 is only in the horizontal direction or the perpendicular direction. In this case, however, it is not necessary to make a precise determination. For example, the case where the absolute value of the horizontal component is equal to or more than ten times the absolute value of the vertical component, or the case where the absolute value of the vertical component is equal to or more than ten times the absolute value of the horizontal component, can be determined as the case where "only one of the components of the motion vector is 0". In other words, the vector component determination unit 24 determines whether the ratio between the absolute value of the horizontal component and the absolute value of the vertical component falls within a predetermined range.

For example, assuming that (the absolute value of the horizontal component)/(the absolute value of the vertical component) is represented as a component ratio R, the predetermined range is determined by an upper limit and a lower limit. For example, when the above-mentioned case where the absolute value of the one component is ten times the absolute value of the other component is used as a threshold, "10" can be set as the upper limit and "0.1" can be set as the lower limit. Accordingly, when the component ratio R is equal to or less than 0.1, the vector component determination unit 24 determines that a movement is made only in the vertical direction. When the component ratio R is equal to or greater than 10, the vector component determination unit 24 determines that a movement is made only in the horizontal direction. When the component ratio R falls within the range of 0.1 to 10, the vector component determination unit 24 determines that an oblique movement is made. The upper limit and the lower limit are not limited to the above-mentioned values.

Thus, when the ratio between the absolute value of the horizontal component and the absolute value of the vertical component is outside of the predetermined range, it is determined that a one-dimensional movement only in the horizontal direction or the vertical direction is made. On the other hand, when the ratio between the absolute value of the horizontal component and the absolute value of the vertical component falls within the predetermined range, it is determined that a two-dimensional movement in the horizontal and vertical directions is made. That is, the angle of view is obliquely moved.

When the second motion vector includes only the horizontal component or the vertical component (YES in S24), the first texture writing unit 25 overwrites the frame memory 29 with the rectangular textures 51 (S25). Specifically, when the circular textures 52 are moved only in one of the vertical direction and the horizontal direction between the frame images, the rectangular textures 51 are written into the frame memory 29.

On the other hand, when the second motion vector does not include only the horizontal component or only the vertical component (NO in S24), the second texture writing unit 26 overwrites the frame memory 29 with the circular textures 52 (S26). Specifically, when the circular textures 52 between the frame images are moved in both the vertical direction and the horizontal direction, the circular textures 52 are written into the frame memory 29. In this manner, the vector component determination unit 24 determines which one of a one-dimensional movement (horizontal movement or vertical movement) or a two-dimensional movement (oblique movement) is made, based on the components of the motion vector. The vector component determination unit 24 determines which one of the rectangular texture 51 and the circular texture 52 is used.

In step S25 or step S26, after the frame memory 29 is overwritten, it is determined whether the frame is the last frame or not (S27). When the frame is not the last frame (NO in S27), the processing of steps S21 to S26 is repeated. When the frame is the last frame (YES in S27), the processing ends.

In this manner, the shape of each texture is changed from the rectangular shape to the circular shape based on the components of the second motion vector. In the above exemplary embodiment, the vector component determination unit 24 selects textures to be written into the frame memory 29, based on the components of the second motion vector. Alternatively, the vector component determination unit 24 may select the textures based on the components of the first motion vector. The vector component determination unit 24 may make the determination based on the vertical component and the horizontal component of the first motion vector, to thereby determine which one of the rectangular texture 51 and the circular texture 52 is used. The vector component determination unit 24 may also make the determination based on the vector components of both the first and second motion vectors.

Figure 8:
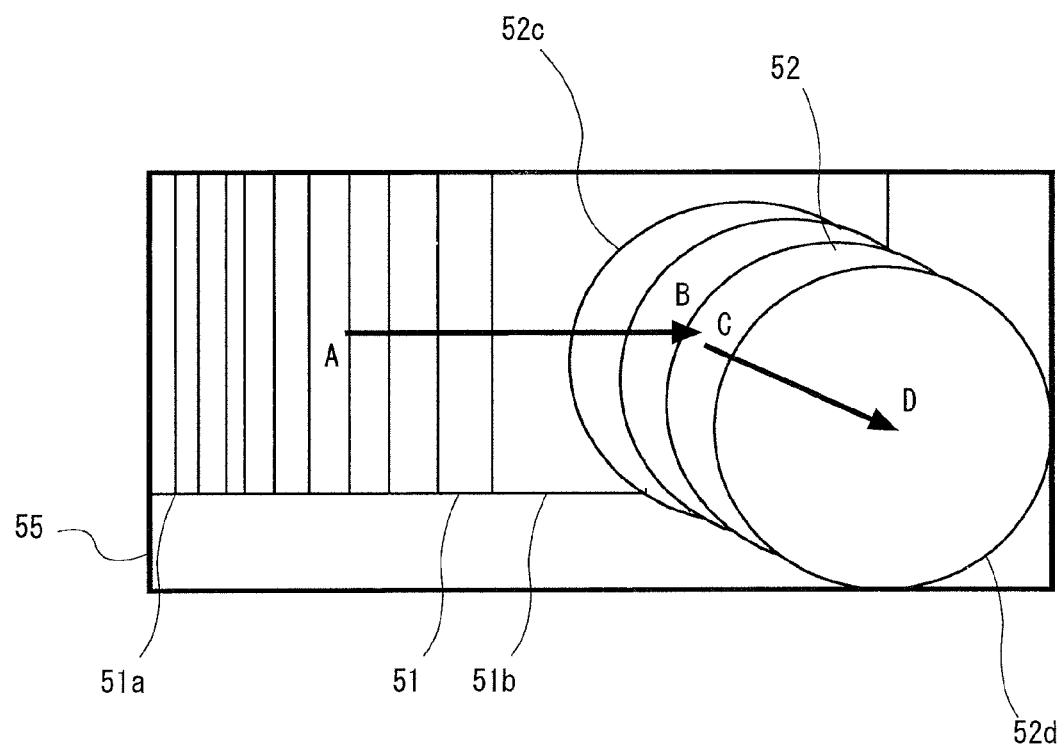
FIG. 8 is a diagram showing a trajectory formed by textures in the image processing method according to the second exemplary embodiment.

FIG. 8 shows an example of the trajectory formed by the textures according to the second exemplary embodiment. FIG. 8 illustrates a case where the angle of view is moved in the order of A, B, C, and D. The angle of view is moved only in the horizontal direction in the section from A to B. The angle of view is obliquely moved in the section from C to D. The trajectory of the center point of each texture is indicated by arrows in FIG. 8.

In the section from A to B, the motion vector includes only the horizontal component, and thus the vertical component is 0. Accordingly, the vector component determination unit 24 determines that only one of the components of the motion vector is 0 (YES in step S24). Therefore, the first texture writing unit 25 overwrites the frame memory 29 with the rectangular textures 51. Thus, the frame memory 29 is sequentially overwritten with textures in order from a texture 51a to a texture 51b. In this manner, the rectangular textures 51 are each written into the frame memory 29 at a position corresponding to the first motion vector.

In the section from C to D, the second motion vector does not include only the vertical component or only the horizontal component, so that neither the vertical component nor the horizontal component is 0. Accordingly, the vector component determination unit 24 does not determine that only one of the components of the motion vector is 0 (NO in step S24). Therefore, the second texture writing unit 26 overwrites the frame memory 29 with the circular textures 52. Thus, the frame memory 29 is sequentially overwritten with textures in order from a texture 52c to a texture 52d. In this manner, the circular textures 52 are each written into the frame memory 29 at a position corresponding to the second motion vector.

When only one of the components of the second motion vector is 0, the first texture writing unit 25 aligns the frames according to the first motion vector. Further, the first texture writing unit 25 overwrites the frame memory 29 with the rectangular texture 51 of the temporally subsequent frame image. The reason for overwriting the frame memory 29 with the rectangular texture 51 in this case is that when the motion is only in the horizontal direction or the vertical direction as shown in FIGS. 17 and 18, the problem of occurrence of distortions and seams formed due to differences in brightness or color is less likely to occur. Furthermore, the use of the rectangular texture 51 makes it possible to generate a larger joined image. When the rectangular texture 51 having the same pixel size as that of the frame image is used, the area of the entire frame image can be used, thereby making it possible to generate a larger joined image.

On the other hand, in cases other than the case where only one of the components of the second motion vector is 0, the second texture writing unit 26 overwrites the frame memory 29 with the circular texture 52. Specifically, when the second motion vector includes components in an oblique direction, the vector component determination unit 24 determines that an oblique movement is made. In the case of the oblique movement, the frame memory is overwritten with the circular texture 52 at the position corresponding to the second motion vector. This processing is similar to that of the first exemplary embodiment. Accordingly, as in the first exemplary embodiment, the problem that distortions and seams formed due to differences in brightness or color become noticeable can be avoided.

Third Exemplary Embodiment

Figure 9:
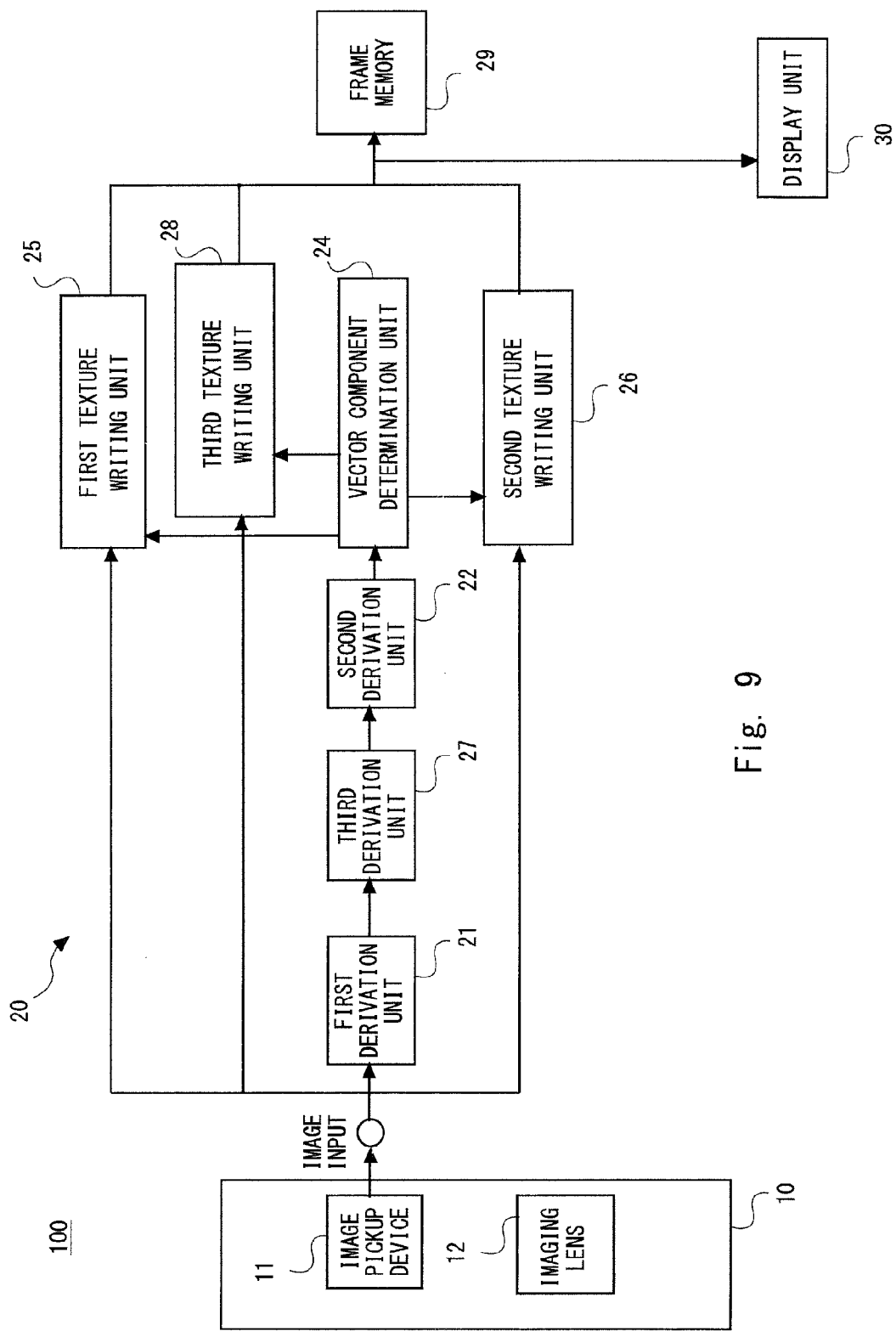
FIG. 9 is a block diagram showing a configuration of a camera according to a third exemplary embodiment.
Figure 10:
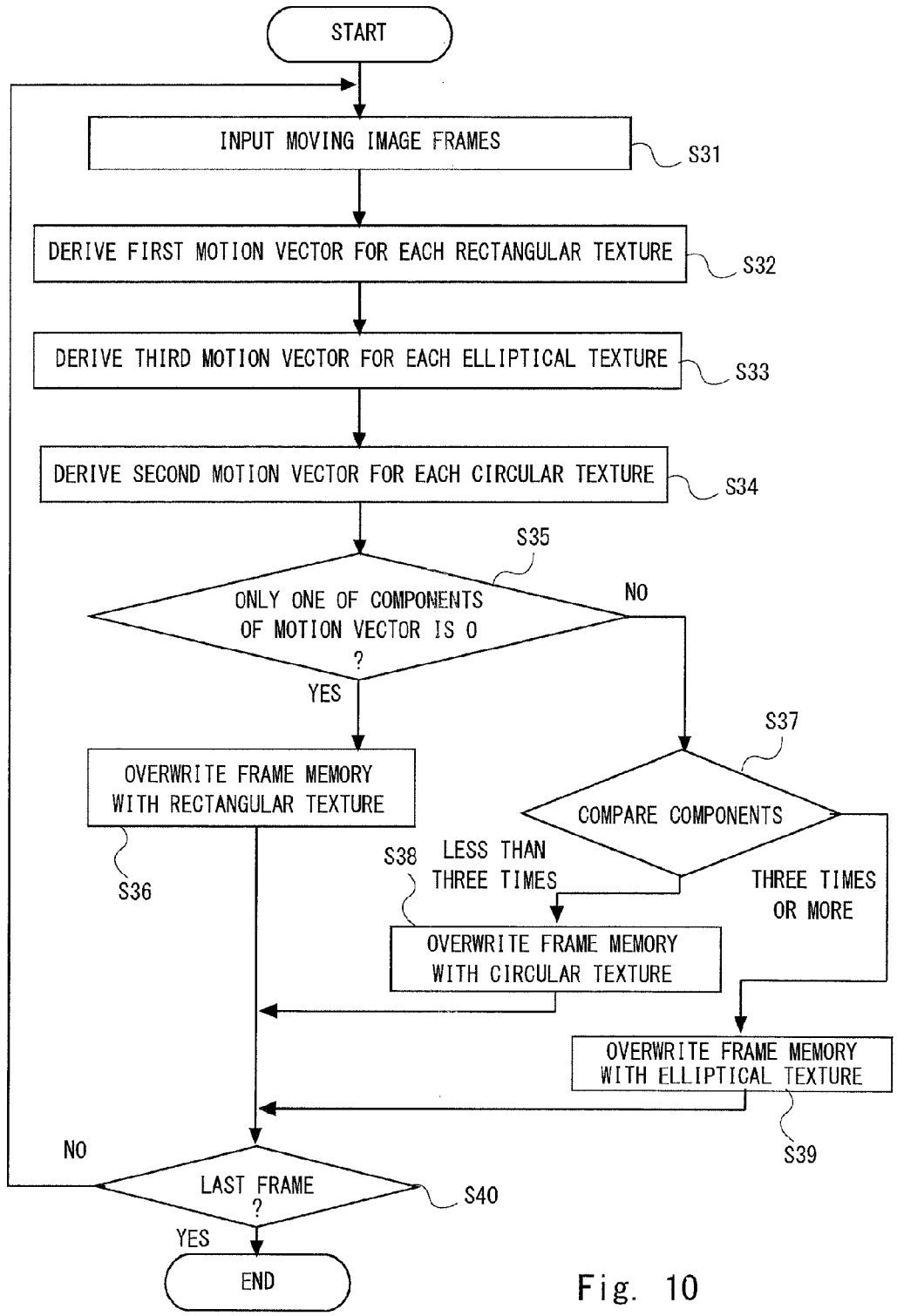
FIG. 10 is a flowchart showing an image processing method according to the third exemplary embodiment.

In a third exemplary embodiment, the shape of each texture is changed based on the components of each motion vector. An image processing apparatus and an image processing method according to the third exemplary embodiment will be described with reference to FIGS. 9 and 10. FIG. 9 is a block diagram showing the configuration of the camera 100 that incorporates the image processing apparatus 20. FIG. 10 is a flowchart showing the processing method in the image processing apparatus 20.

As shown in FIG. 9, a third derivation unit 27 and a third texture writing unit 28 are added to the configuration of the camera according to the second exemplary embodiment shown in FIG. 6. In other words, one derivation unit and one texture writing unit are added to the configuration of the second exemplary embodiment. Since the basic configuration of the image processing apparatus 20 and the processing thereof are similar to those of the first and second exemplary embodiments, the description thereof is omitted. Specifically, the processing in each of the first derivation unit 21 to the second texture writing unit 26 is similar to that of the exemplary embodiment 2.

Since steps S31, S32, S34, S35, S36, S38, and S40 are similar to those of the first and second exemplary embodiments, the detailed description thereof is omitted. Specifically, steps S31, S32, S34, S35, S36, S38, and S40 in the third exemplary embodiment respectively correspond to steps S21, S22, S23, S24, S25, S26, and S27 in the above exemplary embodiments, and thus the duplicate description thereof is omitted.

Figure 11:
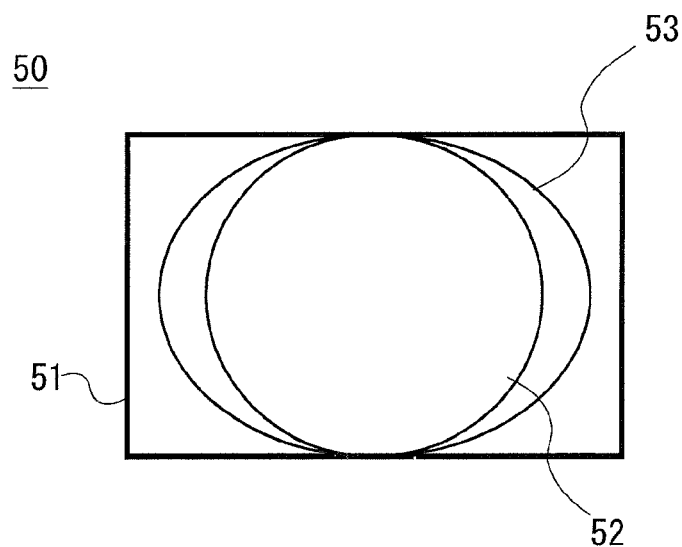
FIG. 11 is a diagram showing textures in a frame image.

FIG. 11 is a diagram showing textures in the frame image 50. The third derivation unit 27 uses an elliptical texture 53 as shown in FIG. 11. The elliptical texture 53 has a pixel size smaller than that of the frame image 50 or the rectangular texture 51. The elliptical texture 53 has an elliptical shape inscribed in the rectangular texture 51, and the center of the elliptical texture 53 matches the center of the rectangular texture 51. Accordingly, the elliptical texture 53 is included in the rectangular texture. Further, the circular texture 52 has a pixel size smaller than that of the elliptical texture 53. The center of the circular texture 52 matches the center of the elliptical texture 53. The circular texture 52 is included in the elliptical texture 53.

After the derivation of the first motion vector by the first derivation unit 21 (S32), the third derivation unit 27 calculates a third motion vector based on the elliptical texture 53 (S33). The third derivation unit 27 derives the third motion vector based on the derivation result of the first motion vector. The third derivation unit 27 derives, as the third motion vector, a global motion vector between elliptical textures 53 of two successive frame images.

After the derivation of the third motion vector by the third derivation unit 27, the second derivation unit 22 derives the second motion vector (S34). Then the vector component determination unit 24 determines whether only one of the components of the second motion vector is 0 (S35).

For example, when it is determined that only the horizontal component of the second motion vector is 0 (YES in S35), i.e., when a one-dimensional movement is made, the first texture writing unit 25 overwrites the frame memory 29 with the rectangular texture (S36).

On the other hand, when it is not determined that only one of the components of the second vector is 0, i.e., when a movement other than a one-dimensional movement is made, the vector component determination unit 24 compares the vertical component of the motion vector with the horizontal component thereof (S37). In this case, the vector component determination unit 24 compares the magnitude of the vertical component of the second motion vector with the magnitude of the horizontal component thereof. The vector component determination unit 24 determines whether the movement is an oblique movement close to the horizontal movement or the vertical movement, or an oblique movement with an inclination close to 45 degrees.

For example, the vector component determination unit 24 compares the vertical component and the horizontal component of the second motion vector, and determines whether one of the horizontal component and the vertical component of the second motion vector is equal to or more than three times the other one of the horizontal component of the vertical component thereof. When one of the horizontal component and the vertical component is less than three times the other one of the horizontal component and the vertical component, the third texture writing unit 28 overwrites the frame memory 29 with the circular texture 52 (S38). When one of the horizontal component and the vertical component is equal to or more than three times the other one of the horizontal component and the vertical component, the third texture writing unit 28 overwrites the frame memory 29 with the elliptical texture 53 (S39).

For example, as mentioned above, (the absolute value of the horizontal component)/(the absolute value of the vertical component) is represented as the component ratio R. The vector component determination unit 24 determines whether the component ratio R falls within the range of ⅓ to 3. When the component ratio R is equal to or less than ⅓, or equal to or more than 3, the vector component determination unit 24 determines that the movement is an oblique movement close to the horizontal movement or the vertical movement. On the other hand, when the component ratio R falls within the range of ⅓ to 3, the vector component determination unit 24 determines that the movement is an oblique movement with an inclination close to 45 degrees. That is, when an oblique movement is made with a large inclination from the horizontal direction and the vertical direction, the circular texture 52 is used. When an oblique movement close to the horizontal movement or the vertical movement is made, the elliptical texture 53 is used.

This configuration prevents the generation of a portion in which an initially-overwritten portion is adjacent to a portion that has been overwritten relatively recently. In other words, the textures which are greatly spaced apart in terms of time are prevented from being adjacent to each other. Accordingly, the problem of occurrence of distortions and seams formed due to differences in brightness or color can be avoided. Furthermore, the use of the elliptical texture 53, which is larger than the circular texture 52, makes it possible to obtain a larger joined image.

In this manner, the shape of each texture is changed from the rectangular shape to the circular shape based on the components of the second motion vector. In the above exemplary embodiment, the vector component determination unit 24 selects textures to be written into the frame memory 29 based on the components of the second motion vector. Alternatively, the vector component determination unit 24 may select the textures based on the components of the first motion vector or the components of the third motion vector. The vector component determination unit 24 may make the determination based on the vertical component and the horizontal component of the first motion vector, or the vertical component and the horizontal component of the third motion vector, to thereby determine which one of the rectangular texture 51, the elliptical texture 53, and the circular texture 52 is used. The vector component determination unit 24 may make the determination based on all the vector components of the first to third motion vectors.

Figure 12:
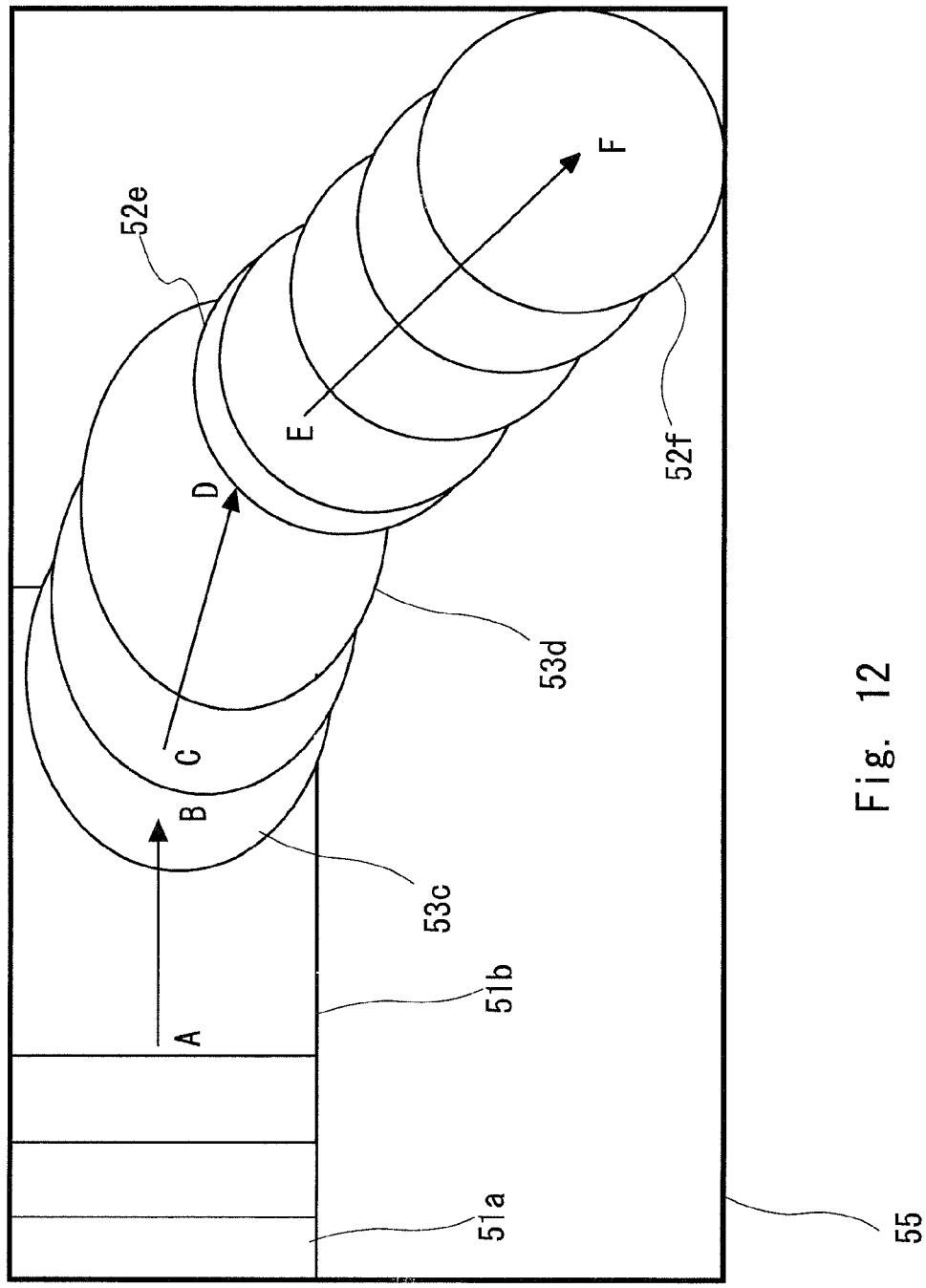
FIG. 12 is a diagram showing a trajectory formed by textures in the image processing method according to the third exemplary embodiment.

FIG. 12 is a diagram showing an example of the joined image 55 generated by the image processing method according to the third exemplary embodiment. FIG. 12 illustrates a case where the angle of view is moved in the order of A, B, C, D, E, and F. In the section from A to B, the angle of view is moved only in the horizontal direction. In the section from C to D, the angle of view is moved in an oblique direction close to the horizontal direction. In the section from E to F, the angle of view is moved in a direction with an inclination close to 45 degrees. The trajectory of the center point of each texture is indicated by arrows in FIG. 12.

In the section from A to B, the motion vector includes only the horizontal component, and thus the vertical component is 0. Accordingly, the vector component determination unit 24 determines that only one of the components of the motion vector is 0 (YES in step S35). Therefore, the first texture writing unit 25 overwrites the frame memory 29 with the rectangular textures 51. Thus, the frame memory 29 is sequentially overwritten with textures in order from the texture 51*a* to the texture 51*b*. The rectangular textures 51 are each written into the frame memory 29 at a position corresponding to the first motion vector.

In the section from C to D, the motion vector indicates a direction that is slightly inclined from the horizontal direction. Accordingly, the vector component determination unit 24 determines that the horizontal component is equal to or more than three times the vertical component ("three times or more" in S35). Therefore, the third texture writing unit 28 overwrites the frame memory 29 with the elliptical texture 53 (S39). Thus, the frame memory 29 is sequentially overwritten with textures in order from the texture 53*c* to the texture 53*d*. The elliptical texture 53 is written into the frame memory 29 at a position corresponding to the third motion vector.

In the section from E to F, the second motion vector indicates an oblique direction with an inclination close to 45 degrees. Accordingly, the vector component determination unit 24 determines that one of the horizontal component and the vertical component is less than three times the other one of the horizontal component and the vertical component ("less than three times" in S35). Therefore, the second texture writing unit 26 overwrites the frame memory 29 with the circular textures 52 (S38). Thus, the frame memory 29 is sequentially overwritten with textures in order from a texture 52*e* to a texture 52*f*. The circular textures 52 are each written into the frame memory 29 at a position corresponding to the second motion vector.

In the above exemplary embodiment, the elliptical texture is used when one of the horizontal component and the vertical component of the motion vector is equal to or more than three times the other one of the horizontal component and the vertical component thereof. However, the threshold used for the vector component determination unit 24 to make the determination is not limited to the case where one of the components is equal to or more than three times the other one of the components. The vector component determination unit 24 may make the determination according to the absolute value of each component, instead of using the component ratio. For example, the vector component determination unit 24 may make the determination by comparing one of the horizontal component and the vertical component with the threshold. That is, the vector component determination unit 24 can make the determination based on vector components.

Three types of textures, i.e., the rectangular texture 51, the circular texture 52, and the elliptical texture 53, are used in the third exemplary embodiment. However, the number of types of textures is not limited to three. For example, four or more types of textures may be used. Furthermore, the shape of each texture can be arbitrarily changed depending on the component ratio between the vertical component and the horizontal component, or the magnitude of the components. For example, the ellipticity (aspect ratio) of the elliptical texture may be continuously changed according to the component ratio R. Moreover, any texture can be used as long as the texture has such a shape that at least a part of the outline thereof is curved. Examples of the texture having such a shape that at least a part of the outline thereof is curved include textures having a circular shape, an elliptical shape, or a shape with no corner. A texture having a polygonal shape with a side that is not parallel to end sides of a frame image can also be used. Examples of such a texture include textures having a polygonal shape such as a rhomboid or a hexagon.

The first motion vector may be derived using a texture having such a shape that at least a part of the outline thereof is curved.

(Modified Example 1 of Texture)

Figure 13:
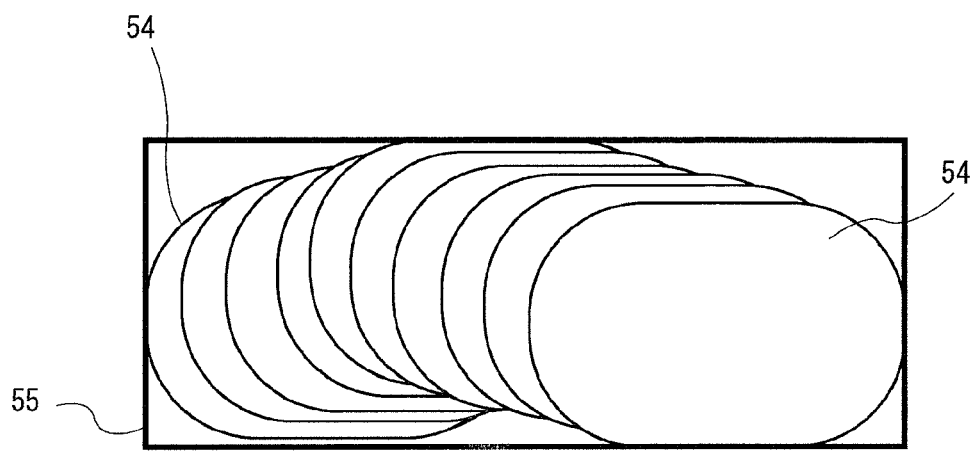
FIG. 13 is a diagram showing a trajectory formed by textures according to Modified Example 1.

FIG. 13 shows an example of textures having such a shape that a part of the outline thereof is curved. Referring to FIG. 13, textures 54 each have a rectangular shape with four rounded corners. In other words, four corners of the rectangular textures 54 shown in FIG. 13 are formed in an arcuate shape. The image processing apparatus 20 generates the joined image 55 by joining the textures 54 having no corner.

The textures 54 shown in FIG. 13 can be used instead of the circular textures 52 and the elliptical textures 53 which are used in the first to third exemplary embodiments. The use of the textures 54 can avoid the occurrence of distortions and seams formed due to differences in brightness or color. In other words, the use of the textures 54 prevents the problem that, as shown in FIG. 16, the latest frame located on the rightmost side is brought into contact with the frame which is greatly spaced apart from the latest frame in terms of time. The use of the textures 54 having no corner as shown in FIG. 13 greatly contributes to solving the problem of occurrence of distortions and seams.

(Modified Example 2 of Texture)

Figure 14:
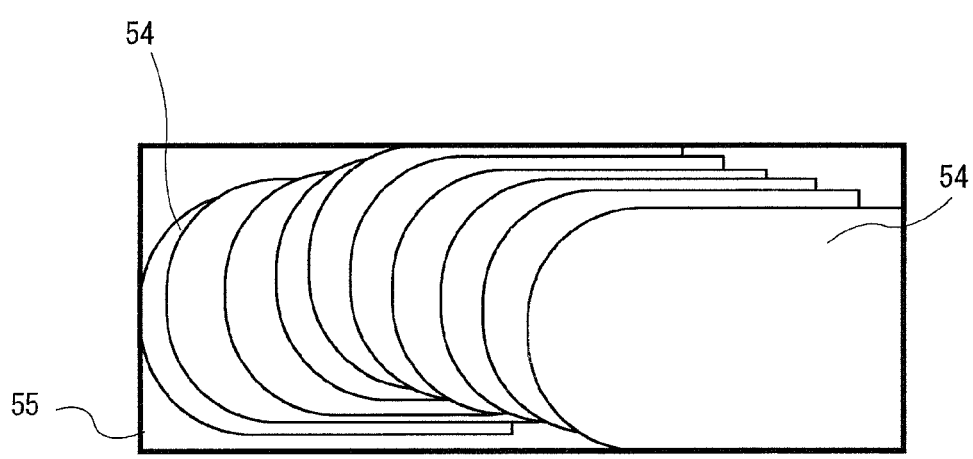
FIG. 14 is a diagram showing a trajectory formed by textures according to Modified Example 2.

FIG. 14 shows another example of the textures having such a shape that a part of the outline thereof is curved. Referring to FIG. 14, the textures 54 each have a rectangular shape with two rounded corners. In other words, the upper left corner and the lower left corner of each texture 54 having a rectangular shape as shown in FIG. 14 are formed in an arcuate shape, and the lower right corner and the upper right corner of each texture 54 are right-angle corners. The image processing apparatus 20 generates the joined image 55 by joining the textures 54 each having such a shape.

The textures 54 shown in FIG. 14 can be used instead of the circular textures 52 and the elliptical textures 53 of the first to third exemplary embodiments. The use of the textures 54 can avoid the occurrence of distortions and seams formed due to differences in brightness or color. In other words, the use of the textures 54 prevents the problem that, as shown in FIG. 16, the latest frame located on the rightmost side is brought into contact with the frame which is greatly spaced apart from the latest frame in terms of time. The size of each texture 54 shown in FIG. 14 can be increased compared to the size of each texture 54 shown in FIG. 13. That is, each texture 54 has a smaller number of rounded corners in Modified Example 2, which leads to an increase in the area of the frame memory 29 in which the textures 54 are written.

The textures 54 shown in FIG. 14 have two rounded corners on the trailing end side of the direction in which the angle of view is moved, and have two right-angle corners on the leading end side thereof. That is, since the angle of view is moved rightward in FIG. 14, two left-side corners of each texture 54 are rounded corners and two right-side corners of each texture 54 are right-angle corners. In Modified Example 2, the image processing apparatus 20 may determine the corners to be rounded among the four corners of the rectangular texture according to motion vectors. In other words, the image processing apparatus 20 may obtain the direction of movement of the angle of view according to motion vectors and determine the corners to be rounded based on the direction of movement of the angle of view. In this case, it is preferable to round the corners on the trailing end side of the direction of movement of the angle of view. For example, when the angle of view is moved downward, the upper right corner and the upper left corner are rounded. When the angle of view is moved upward, the lower right corner and the lower left corner are rounded. When the angle of view is moved leftward, the upper right corner and the lower right corner are rounded. This configuration prevents the occurrence of distortions and seams formed due to differences in brightness or color. Thus, the motion of each texture 54 can be changed according to the motion between images.

(Modified Example 3 of Texture)

Figure 15:
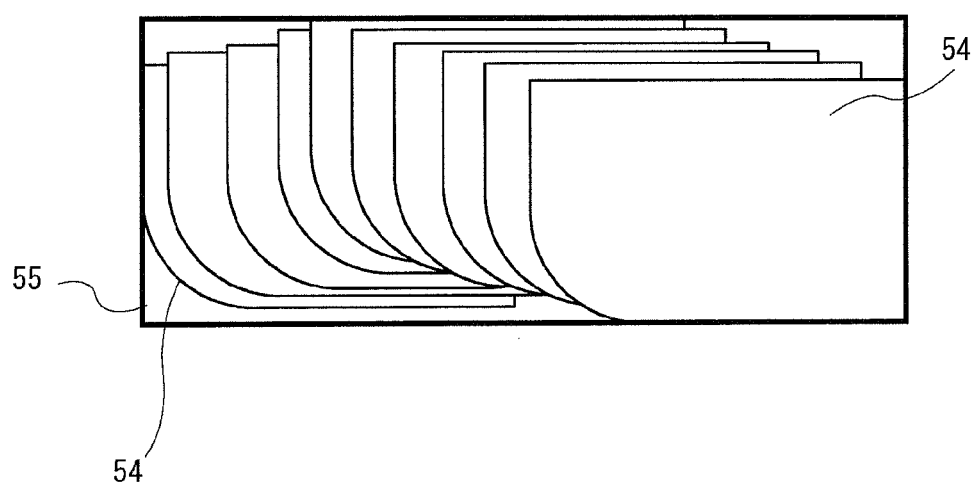
FIG. 15 is a diagram showing a trajectory formed by textures according to Modified Example 3.

FIG. 15 shows further another example of the textures having such a shape that a part of the outline thereof is curved. Referring to FIG. 15, the textures 54 each have a rectangular shape with a rounded corner. In other words, the lower left corner of each texture 54 having a rectangular shape as shown in FIG. 15 is formed in an arcuate shape, and the other three corners thereof are right-angle corners. The image processing apparatus 20 generates the joined image 55 by joining the textures 54 having such a shape.

The textures 54 shown in FIG. 15 can be used instead of the circular textures 52 and the elliptical textures 53 of the first to third exemplary embodiments. The use of the textures 54 can avoid the occurrence of distortions and seams formed due to differences in brightness or color. In other words, the use of the textures 54 prevents the problem that, as shown in FIG. 16, the latest frame located on the rightmost side is brought into contact with the frame which is greatly spaced apart from the latest frame in terms of time. The size of each texture 54 shown in FIG. 15 can be increased compared to the size of each texture 54 shown in FIG. 14. That is, each texture 54 has a smaller number of rounded corners in Modified Example 3, which leads to an increase in the area of the frame memory 29 in which the textures 54 are written.

In Modified Example 3, the image processing apparatus 20 may determine the corners to be rounded among the four corners of the rectangular texture according to motion vectors. In other words, the image processing apparatus 20 may obtain the direction of movement of the angle of view according to motion vectors and determine the corners to be rounded based on the direction of movement of the angle of view. In this case, it is preferable to round the corners on the trailing end side of the direction of movement of the angle of view. For example, when the angle of view is moved in a lower right direction, the upper left corner is rounded. Thus, the motion of each texture 54 can be changed according to the motion between images.

Furthermore, as in the second and third exemplary embodiments, the textures 54 shown in FIGS. 13 to 15 may be replaced with each other. In this case, the direction of movement of the angle of view is obtained according to motion vectors, and textures are determined depending on the movement direction. The textures having such a shape that a part of the outline thereof is curved are not limited to the textures having shapes as shown in FIGS. 13 to 15. For example, a texture having a rectangular shape with three rounded corners may be used.

The whole or part of the image processing described above may be implemented by a computer program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

While the invention made by the present inventor has been described in detail above with reference to exemplary embodiments, the present invention is not limited to the above exemplary embodiments. The present invention may be a combination of the exemplary embodiments and modified examples, and can be modified in various manners without departing from the scope of the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

According to the present invention, it is possible to provide an image processing apparatus, an image processing method, a program, and a camera which are capable of generating a joined image in which distortions and seams are less likely to occur.

The above and other objects, features and advantages of the present invention will become more fully understood from the detailed description given hereinabove and the accompanying drawings which are given by way of illustration only, and thus are not to be considered as limiting the present invention.

What is claimed is:

1. An image processing apparatus that generates a joined image by joining a plurality of textures based on a plurality of images, the image processing apparatus comprising:
    a frame memory into which the plurality of textures that form the joined image are written;
    a first derivation unit that derives a first motion vector based on a first texture, the first texture being a partial area or an entire area of an image captured by an image pickup unit that captures the plurality of images;
    a second derivation unit that derives a second motion vector based on a second texture by using a derivation result of the first derivation unit, the second texture having a pixel size smaller than that of the first texture;
    a determination unit that determines which one of the first texture and the second texture is to be written into the frame memory, according to a horizontal component and a vertical component of the second motion vector; and
    a texture writing unit that writes, into the frame memory, the second texture at a position corresponding to the second motion vector.

2. The image processing apparatus according to claim 1, wherein
    when a ratio between an absolute value of the horizontal component and an absolute value of the vertical component falls within a predetermined range, the texture writing unit writes the second texture into the frame memory, and
    when the ratio between the absolute value of the horizontal component and the absolute value of the vertical component is outside of the predetermined range, the texture writing unit writes the first texture into the frame memory.

3. The image processing apparatus according to claim 1, wherein the texture writing unit changes a shape of the second texture to be written into the frame memory, according to the horizontal component and the vertical component.

4. The image processing apparatus according to claim 1, wherein the second texture has a circular shape.

5. The image processing apparatus according to claim 1, wherein
    the first texture has a rectangular shape having the same pixel size as that of a frame image obtained by the image pickup unit, and
    the second texture is inscribed in the first texture.

6. A camera comprising:
    an image pickup unit that captures a plurality of images; and
    the image processing apparatus according to claim 1.

7. An image processing method that generates a joined image by joining a plurality of textures based on a plurality of images, the image processing method comprising:
    deriving a first motion vector based on a first texture, the first texture being a partial area or an entire area of an image captured by an image pickup unit that captures the plurality of images;
    deriving a second motion vector based on a second texture by using a derivation result of the first motion vector, the second texture having a pixel size smaller than that of the first texture;
    determining which one of the first texture and the second texture is to be written into a frame memory, according to a horizontal component and a vertical component of the second motion vector; and
    writing, as the plurality of textures that form the joined image, the second texture into the frame memory at a position corresponding to the second motion vector.

8. A non-transitory computer readable medium storing a program for causing a computer to execute image processing that generates a joined image by joining a plurality of textures based on a plurality of images, the image processing comprising:
    deriving a first motion vector based on a first texture, the first texture being a partial area or an entire area of an image captured by an image pickup unit that captures the plurality of images;
    deriving a second motion vector based on a second texture by using a derivation result of the first motion vector, the second texture having a pixel size smaller than that of the first texture;
    determining which one of the first texture and the second texture is to be written into a frame memory, according to a horizontal component and a vertical component of the second motion vector; and writing, as the plurality of textures that form the joined image, the second texture into the frame memory at a position corresponding to the second motion vector.

* * * * *